INVENTOR
HARVEY I. JAUVTIS
BY Kenway, Jenney & Hildreth
ATTORNEYS

INVENTOR
HARVEY I. JAUVTIS
BY Fruway, Jenney & Hildreth
ATTORNEYS

INVENTOR
HARVEY I. JAUVTIS
BY Kenway, Jenney & Hildreth
ATTORNEYS

United States Patent Office 3,562,722

Patented Feb. 9, 1971

3,562,722

MAGNETIC THIN FILM SHIFT REGISTER HAVING UNIDIRECTIONAL TRANSMISSION ELEMENTS

Harvey I. Jauvtis, Belmont, Mass., assignor to Cambridge Memories, Inc., Newton, Mass., a corporation of Massachusetts Filed Oct. 20, 1969, Ser. No. 867,675
Int. Cl. G11c *19/00, 11/14*
U.S. Cl. 340—174 10 Claims

ABSTRACT OF THE DISCLOSURE

A digital shift register propagating information as regions of reverse magnetization has a successive arrangement of a first bidirectional transmission element for reciprocal propagation of the magnetic region, a first unidirectional transmission element for non-reciprocal propagation of the magnetic region, a second bidirectional transmission element, and another unidirectional transmission element in each of a series-succession of stages, with all unidirectional transmission elements having the same direction of forward propagation. A magnetic field source applies a magnetic field to the transmission elements to advance regions of reverse magnetization from one bidirectional element, through the unidirectional element in the forward direction, to the next bidirectional element. A further magnetic field erases the regions of reverse magnetization from the elements in each stage except that in one instance the regions present in the first bidirectional elements are not erased and in another instance the regions in the second bidirectional elements are not erased.

BACKGROUND OF THE INVENTION

This invention relates to a digital register for storing and shifting information in the form of discrete regions of unique magnetization. In particular the invention provides a magnetic thin film shift register employing a pair of unidirectional magnetic transmission elements in each stage. The register can operate with magnetic fields directed along only one axis. This enables the register to be constructed at less cost and more compactly than prior magnetic shift registers, and to operate with greater reliability.

The shift register operates by storing and propagating, for each unit of information being processed, a domain of reverse magnetization in an anisotropic magnetic film. The register moves the domain by the technique of domain tip propagation. In domain tip propagation, a narrow channel of relatively low magnetic coercivity is formed in a body of anisotropic ferromagnetic material that otherwise has a relatively high magnetic coercivity. The magnetization of the body of material is saturated along the easy axis in a forward direction. A domain of reverse magnetization is nucleated at a point along the channel by application of a localized magnetic switching field. The domain, which has a lenticular shape with roughly triangular leading and trailing edges, can be propagated along the channel by application of a magnetic field smaller than the nucleating field and directed along the direction in which the domain is to propagate. U.S. Pat. No. 3,438,006 describes AND, OR and like logic elements for processing information according to domain tip propagation and U.S. Pat. No. 3,465,316 describes nonreciprocal, i.e. unidirectional, domain tip propagation devices. Further, U.S. Pat. No. 3,438,016 describes a domain tip propagation shift register that is considered to be prior art for the present invention.

An object of this invention is to provide a shift register of digital information represented by discrete regions of magnetization and which is characterized by operation with magnetic fields directed along only a single axis.

Another object of the invention is to provide a shift register of digital information represented by discrete regions of magnetization and which operates with a minimal number of magnetic field sources.

A further object is to provide such a shift register capable of reliable operation with magnetic fields having relatively wide magnitude tolerances.

It is also an object of the invention to provide a magnetic thin film shift register of the above character capable of fast operation and of relatively high-density information storage.

Another object is to provide a shift register of the above character capable of relatively low cost manufacture and which can be fabricated with relatively small size and low weight.

Other objects of the invention will in part be obvious and will in part appear hereinafter.

SUMMARY OF THE INVENTION

In general, the shift register has a succession of stages forming a signal path for reverse magnetization domains. Each stage is formed by the successive series interconnection of a first bidirectional magnetic transmission element, a first unidirectional magnetic transmission element, a second bidirectional transmission element and a second unidirectional transmission element. The other side of the second unidirectional element is connected to the first bidirectional element of the next successive stage along the shift register path, thereby interconnecting the stages.

Each unidirectional transmission element is arranged so that its easy, forward conduction is oriented in the same direction along the signal path through the shift register. Further, the path is made of anisotropic ferromagnetic material having an easy axis of magnetization directed along the direction in which the path extends.

A magnetic field source is provided to introduce domains of reverse magnetization into an input end of the shift register path, and field sensing means is provided at the output end of the path to produce an output signal when a reverse magnetization domain is shifted into that part of the path. Additional magnetic field sources are provided to propagate reverse magnetization domains along the path, and to erase domains from selected transmission elements of the path.

With this arrangement, the shift register advances information-identifying domains along the path by first producing a propagate field that advances each domain present at a first bidirectional transmission element of a stage through the adjoining unidirectional transmission element to the next, second, bidirectional transmission element of the stage. In some instances an opposite, blocking field is also produced to prevent the domain from propagating beyond the latter bidirectional transmission element.

An erase field, opposite to the direction of the propagate field, is then applied to the first bidirectional transmission element and both unidirectional transmission elements of each stage to erase any domains present there. This leaves information-bearing domains present only at the second bidirectional transmission elements.

The operating cycle of the shift register continues with the application of another propagate step identical to the first one except that the domain transfer now is from the second bidirectional transmission element of every stage where a domain is present, through the adjoining unidirectional transmission element and into the first bidirectional transmission element of the next stage. The last step in the shift cycle is the application of an erase field to the second bidirectional transmission element and both unidirectional transmission elements in all the stages.

Hence at the end of each cycle of shift operation, the first bidirectional transmission element in each stage contains the same information-bearing domain that was in the first bidirectional transmission element of the preceding stage at the end of the preceding cycle.

The invention achieves this result with magnetic fields directed only along a single axis, i.e. the easy magnetization axis of the material from which the register is made. Further, because the shift register requires only magnetic fields directed along this single axis, the magnitudes of the fields can vary within relatively wide operating tolerances without adverse effect. For example, the drive field can have a tolerance of at least plus or minus 25%. In addition, the register is easy to make because the unidirectional transmission elements can simply be bidirectional transmission elements having tailored geometry. Fabrication is also simplified by the fact that the magnetic material does not have to support domain propagation with magnetic fields directed transverse to the easy axis of magnetization.

BRIEF DESCRIPTION OF THE DRAWINGS

For a fuller understanding of the nature and objects of the invention, reference should be had to the following detailed description taken in connection with the accompanying drawings, in which.

DESCRIPTION OF ILLUSTRATED EMBODIMENTS

Figure 1:
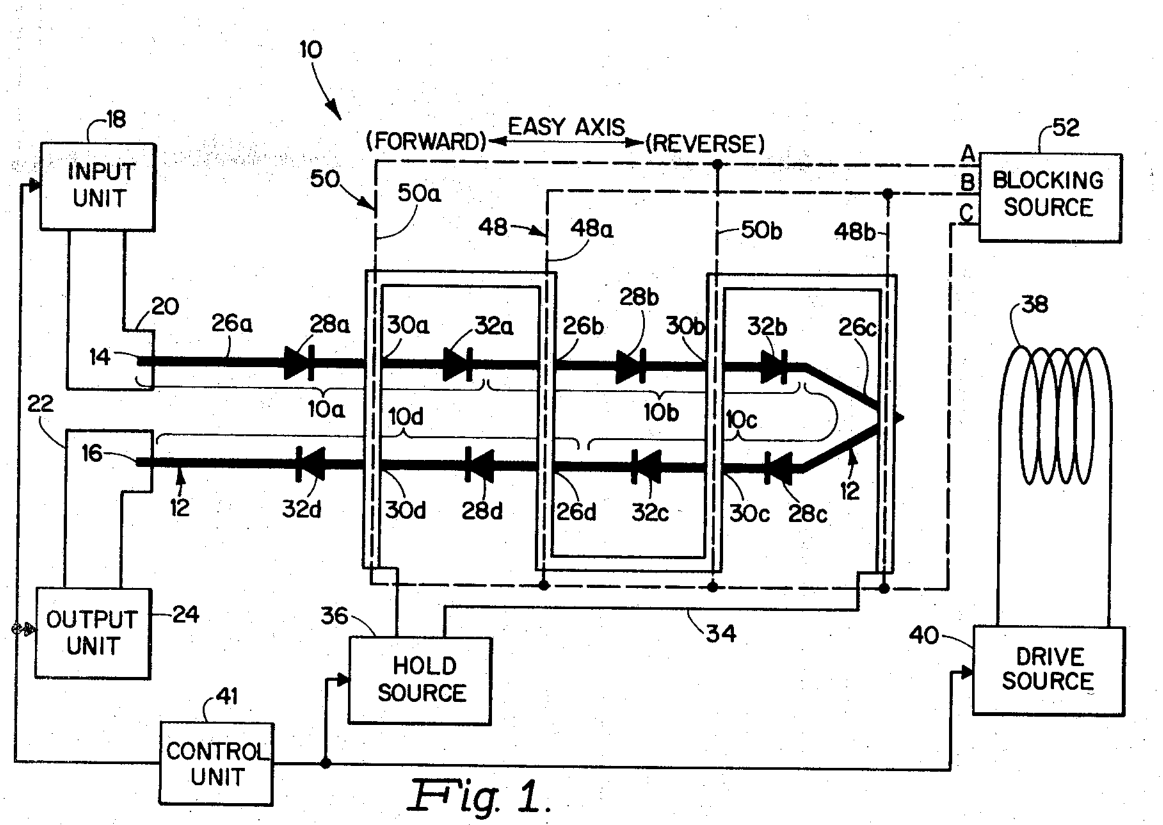
FIG. 1 is a schematic diagram of a shift register embodying the invention.

With reference to FIG. 1, a four-stage shift register 10 embodying the invention appears schematically to have a signal path 12 extending from an input port 14 to an output port 16. The signal path is formed of a low coercivity magnetic channel embedded in a body of high coercivity magnetic material. Both materials are magnetically anisotropic with an easy axis oriented as shown. The magnetization of the high coercivity material and, similarly, that of the low coercivity material forming the path 12, are initially saturated along the easy axis in a forward direction, which extends from right to left in FIG. 1.

An input unit 18 is connected to a nucleate-field producing element illustrated as a write wire 20 crossing the path 12 at the input port. Current in the write wire from the input unit 18 produces a magnetic field of sufficient strength to nucleate a domain of reverse magnetization in the path 12 at the input port.

Similarly, at the output port 16, a field-sensing element, in the form of a read wire 22 inductively coupled to the path at that port, is connected to operate an output unit 24 when a domain of reverse magnetization advances into the output port along the path 12.

The path 12 has four essentially identical shift register stages **10*a*· 10*b*, 10*c*, and 10*d* in a series-succession between the input port 14 and the output port 16. The first stage 10*a* is formed with four domain-propagating transmission elements arranged in a series succession starting with a first bidirectional element 26*a* which starts the path 12 from the input port 14, a first unidirectional transmission element 28*a*, a second bidirectional transmission element 30*a*, and a second unidirectional transmission element 32*a*. Each unidirectional transmission element 28*a* and 32*a* has a direction of easy forward magnetic domain propagation much like the conduction of a conventional diode; hence these elements are schematically shown herein as diodes. The unidirectional transmission elements in stage 10*a*, as in the other stages of the shift register, are oriented with their forward conduction directed from the input port 14 toward the output port 16**.

The end of the second unidirectional element **32*a* in the stage 10*a* opposite to the end connection to the bidirectional element 30*a*, feeds into the first bidirectional element 26*b* of the second shift register stage 10*b*, thereby forming the connection between the stages. The other stages of the shift register are constructed in like manner and are similarly interconnected, as shown. The illustrated path 12 is folded, so as to have two side-by-side legs, by forming the first bidirectional transmission element 26*c* of the third stage 10*c*** with a V-like configuration.

As also shown in FIG. 1, a hold conductor 34, connected to a hold source 36 of direct electrical current, threads back and forth over both legs of the path 12 to cross each bidirectional transmission element. The hold conductor is arranged to couple a magnetic HOLD field into the portion of the path 12 which it overlies. The HOLD field is oriented along the easy axis with a direction determined by the polarity of the current the conductor 34 receives from the hold source 36. In addition, a drive conductor 38, connected to a drive source 40 of electrical current, is arranged to impose a magnetic DRIVE field along the entire path 12 and oriented along the easy axis. A DRIVE field directed in the forward, i.e. right to left, direction is termed an ERASE field, and a reverse DRIVE field is termed a PROPAGATE field.

As indicated above, digital information is stored and transferred in the shift register 10 in the form of discrete domains of reverse magnetization. Specifically, a binary ONE is usually represented by a domain of reverse magnetization, and a binary ZERO represented by the absence of such a domain. In essence, the shift register operates by moving a domain along the path 12 from one bidirectional transmission element through the adjoining unidirectional transmission element to the next bidirectional transmission element. Two such domain-advancing steps are normally performed in each operating cycle.

Figure 2:
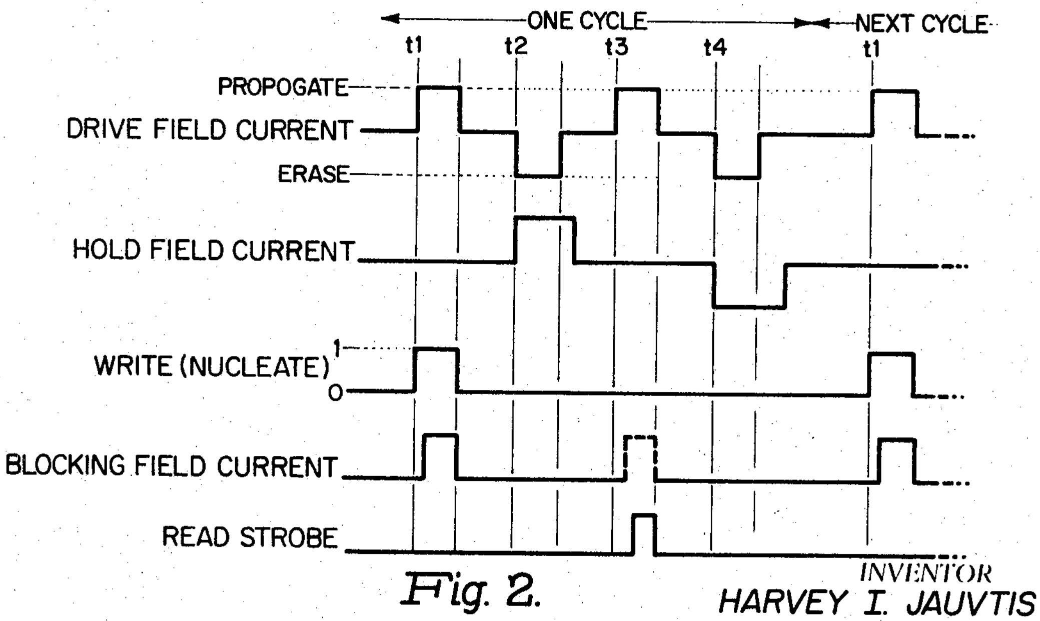
FIG. 2 is a timing chart illustrating the operation of the shift register of FIG. 1.

FIG. 2 shows the waveforms of the DRIVE field and HOLD field magnitudes as a function of time, together with the operation of the domain-writing input unit and the domain-reading output unit, for a typical operation. Referring to these waveforms and FIG. 1, the illustrated sequence commences at time $t_1$ with the input unit 18 applying a write ONE pulse to the write wire 20 to nucleate a domain of reverse magnetization at the input port 14. The drive source 40 operates the drive conductor 38, illustratively at the same time, to produce a PROPAGATE field that causes the domain to propagate in stage **10*a* from the input port 14 along bidirectional transmission element 26*a* and through unidirectional transmission element 28*a*, in its forward direction, to bidirectional transmission element 30*a*. The drive source terminates the PROPAGATE field at the appropriate time so that the domain does not propagate along the path 12** further than from one bidirectional transmission element to the next successive bidirectional transmission element.

The next step in the cycle is that at time $t_2$ the drive source 40 energizes the conductor 38 in the opposite direction to produce an ERASE field and at the same time the hold source 36 energizes the hold conductor 34 to induce a HOLD field in the transmission elements crossed by the hold conductor. The ERASE field wipes out reverse magnetization domains from the shift register path 12 except at those locations where the HOLD field is opposite to and hence cancels the ERASE field. Accordingly, in the register stage **10*a*, the domain just propagated into the second bidirectional transmission element 30*a*** is retained, because the HOLD field cancels the ERASE field in this transmission element.

The illustrated operating cycle continues with the production at time $t_3$ of another PROPAGATE field that causes the domain in the stage **10*a*** transmission element 30*a* to advance through the unidirectional element 32*a* and on to the first bidirectional transmission element 26*b* in the second stage 10*b*. The unidirectional transmission element 28*a* in stage 10*a* prevents the domain in transmission element 30*a* from going in the other direction, i.e. back toward the input port 14.

The last step in the operating cycle is another erase and hold operation, illustratively commencing at time $t_4$. Note however that the HOLD field now has a polarity opposite to the polarity of the prior HOLD field, produced starting at time $t_2$. This is because the illustrated hold conductor zigzags back and forth across the path 12, and therefore the conductor segment crossing section 26*b* in stage 10*b* carries current across the path in the direction opposite to the conduction of the same current across section 30*a* in stage 10*a*.

Further, with the illustrated arrangement of the hold conductor 34 zigzagging across the path 12, a single hold conductor cancels the ERASE field only at alternate bidirectional transmission sections along the path, which is desired. And by reversing the polarity of the hold current for successive HOLD fields, in each cycle the HOLD field alternately "holds" domains only lat the first bidirectional elements in the several stages and then "holds" domains only at the second bidirectional elements. It should further be noted that just as the HOLD field opposes the ERASE field at alternate bidirectional transmission elements along the path, the two fields are in the same direction at the other bidirectional transmission elements and hence combine additively. However, the resultant combined field is in the forward direction and hence acts only to erase domains.

Where the shift register had been operating for some time, so that information-bearing domains have been shifted through the register 10 and are being propagated into the output port 16, the output unit 24 stores the signal which an arriving domain induces in read wire 22 during the second propagate step of the cycle. This is indicated in the FIG. 2 waveforms by the "read strobe" signal which operates the output unit 24 during the last part of the PROPAGATE field that began at time $t_3$. A control unit 41, FIG. 1, is connected to the sources 36 and 40, and to the units 18 and 24, to operate then according to the foregoing sequence thus illustrated in FIG. 2.

The operation of the FIG. 1 shift register 10 as thus summarized is depicted in FIGS. 3A through 3F, which show the second and third shift register stages 10*b* and 10*c* with the unidirectional transmission elements therein constructed in a manner disclosed in the aforementioned United States Pat. No. 3,465,316. As described in that patent, each undirectional transmission element shown in FIGS. 3A–3F has a geometry that blocks a lenticular-shaped domain of reverse magnetization from propagating in one direction but yet allows it to propagate in the other direction without significant restriction.

Figure 3A:
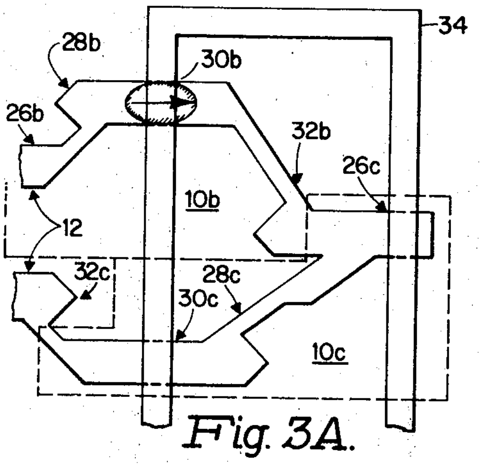
FIGS. 3A through 3F are pictorial representations of a fragment of the FIG. 1 shift register constructed in an illustrative manner and illustrating successive sequences in the operation of the shift register.
Figure 3B:
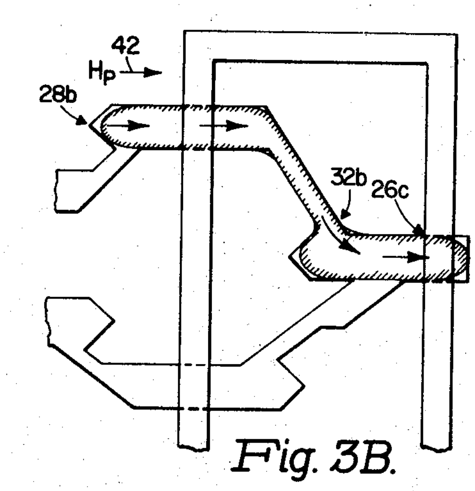

In particular, FIG. 3A shows the register stages 10*b* and 10*c* with no domains in stage 10*c* but with a domain in the second bidirectional conductor element 30*b* of stage 10*b*. The domain is illustrated at the time immediately following an erase and hold operation, e.g. just prior to time $t_3$ in FIG. 2, and hence is present only at the intersection of the hold conductor 34 with the path 12. As shown in FIG. 3B, the ensuing propagate step subjects the path 12 to an applied field $H_p$ having the reverse direction shown by arrow 42 and with a magnitude below that sufficient to nucleate a domain in the path 12. This field causes the domain shown in FIG. 3A to grow in both directions. However, growth of the domain tail toward the left in FIG. 3B, i.e. toward the input port 14, is blocked by the unidirectional transmission element 28*b* in stage 10*b*. On the other hand, domain tip growth to the right, and hence toward the output port 16, is essentially unrestrained through the stage 10*b* unidirectional transmission element 32*b* in the forward direction to the first bidirectional transmission element 26*c* in stage 10*c*. The timing of the termination of the PROPAGATE field $H_p$ prevents further growth of the domain.

Figure 3C:
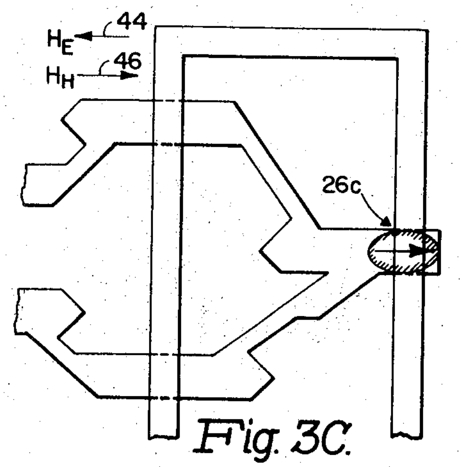

The propagate step depicted in FIG. 3B is followed by an erase and hold step which erases the domain of reverse magnetization from the path 12 except in the portion of the bidirectional transmission element 26*c* over which the hold conductor 34 passes. FIG. 3C shows the domain configuration in the register following this step.

Figure 3D:
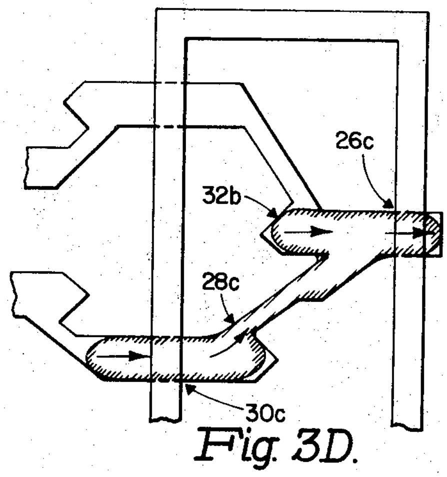
Figure 3E:
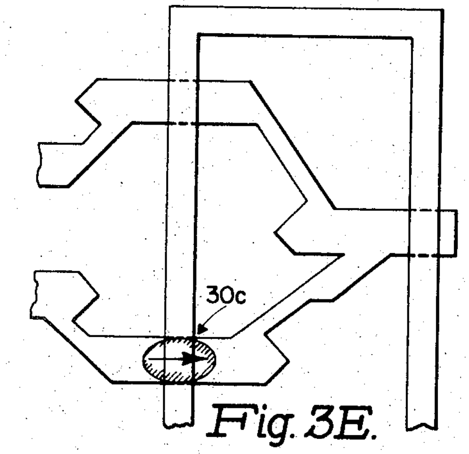
Figure 3F:
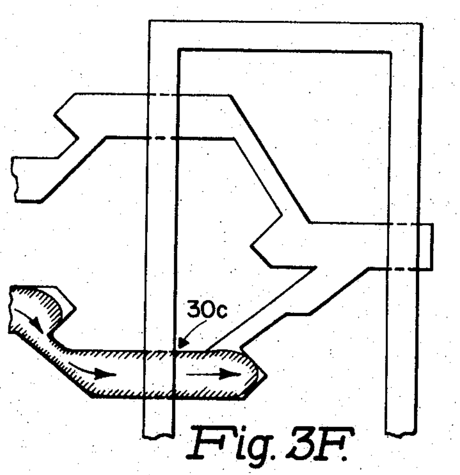

When the cycle proceeds to the next propagate step, the domain shown in FIG. 3C propagates essentially to the configuration shown in FIG. 3D. The unidirectional transmission element 32*b* blocks propagation of the domain back into the stage 10*b*, whereas the domain propagates essentially freely through the unidirectional transmission element 28*c* in stage 10*c* in the forward direction and into the bidirectional transmission element 30*c*. Another erase and hold step reduces the propagated domain from the configuration shown in FIG. 3D to the confined configuration of FIG. 3E. The next propagate step advances the tail of the domain along the third stage 10*c* as shown in FIG. 3F, the domain tip is now blocked by transmisison element 28*c*.

With reference again to FIG. 1, the shift register 10 is further illustrated as having optional blocking conductors 48 and 50. As will now be described, the blocking conductors can be used to ensure that, during a propagate step, a domain does not grow from one bidirectional transmission element to beyond the next bidirectional transmission element along the path 12.

The illustrated blocking conductor 48 includes two conductor segments 48*a* and 48*b*, and the conductor 50 likewise includes segments 50*a* and 50*b*. Each conductor segment crosses both legs of the folded path 12, and the segments of the two conductors are arranged in an alternate succession, with segment 50*b* crossing the path between segments 48*a* and 48*b* and with segment 48*a* crossing the path between segments 50*a* and 50*b*. Further, each segment preferably crosses the path centered over the path-crossings of the hold conductor 34, as illustrated. With this arrangement, a domain tip can reach the "protection" of a hold conductor but not propagate beyond the hold conductor.

A blocking source 52 is connected to energize the conductor segments 48*a* and 48*b* in parallel and to energize the segments 50*a* and 50*b* in parallel. When used, the source 52 energizes the conductor 48 during one propagate step of each cycle and energizes the conductor 50 during the other propagate step of the cycle. FIG. 2 shows typical timing for the blocking field current, with one pair of blocking conductors receiving the "solid-line" waveform and the other receiving the "dotted-line" waveform. Each blocking current pulse preferably begins shortly after a propagate-pulse and ends simultaneously with it as illustrated.

As mentioned above, the blocking conductors are used to prevent a domain from growing, during a propagate step, beyond a desired point along the shift register path 12. This is done by energizing the blocking conductor to produce a magnetic field that cancels the PROPAGATE field at the point where the blocking conductor crosses the path 12. For example, during a propagate step, when the blocking souce 52 energizes the conductor segments 48*a* and 48*b* to produce a magnetic field directed from right to left in FIG. 1, each conductor segment 48*a* and 48*b* produces a blocking field that cancels the PROPAGATE field at the passage of that segment over the path 12. Hence, the segment 48*a* will stop a domain, which is being propagated from element 30*a* to element 26*b*, from propagating further and reaching element 30*b*. The segment 48*a* also blocks a domain from propagating to stage 10*d* element 30*d* from element 26*d*. Likewise, the blocking field of segment 48*b* prevents a domain from advancing beyond stage 10*c* element 26*c* so as to reach element 30*c*.

During the next propagate step, the source 52 energizes the conductor 50 to produce a forward-directed field with the segments 50*a* and 50*b*. The blocking field from the segment 50*a* blocks the domain, which is propagating from stage 10*a* element 26*a* to element 30*a*, from propagating beyond to stage 10*b* element 26*b*. In like manner, the blocking field of segment 50*a* also blocks a domain from propagating beyond element 30*d* to the output port 16. The field produced with segment 50*b* prevents a domain from propagating beyond element 30*b* of stage 10*b* to element 26*c*, and blocks propagation beyond element 30*c* to element 26*d*.

Thus the blocking conductors 48 and 50 and the blocking source 52 connected with them provide means for cancelling the PROPAGATE field at selected points along the shift register path 12 beyond which a domain is not to propagate during a given propagate during a given propagate step.

Figure 4:
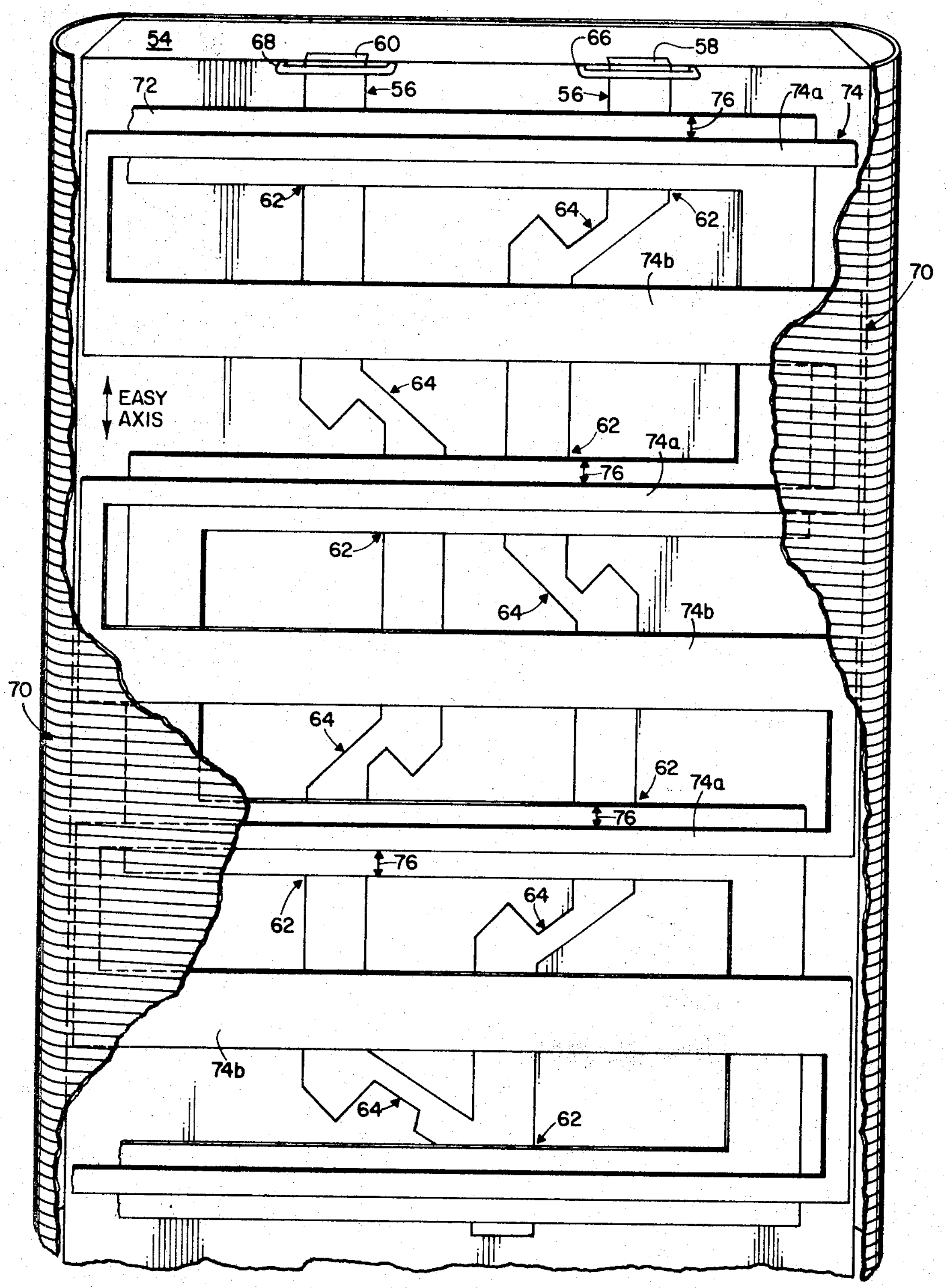
FIG. 4 is a top plan view, partly broken away, of one construction for the shift register of FIG. 1.

As will become apparent from a consideration of the construction shown in FIG. 4 and as illustrated in FIG. 2, the blocking conductors do not need to be energized at the beginning of the propagate step; the blocking action is needed only after a finite time has elapsed during the propagate step. Further, it should be understood that blocking fields are not necessary when the extent of domain propagation during a propagate step is within known limits, due principally to the duration and magnitude of the PROPAGATE field.

Turning to FIG. 4, in an illustrated construction of the present shift register, a slab 54 or other body of high coercivity anisotropic ferromagnetic material has a channel 56 of significantly lower-coercivity anisotropic ferromagnetic material embedded therein. The channel forms, at one end thereof, an input port 58 and forms an output port 60 at the other end. Further the channel forms the shift register path of bidirectional transmission elements 62, for holding a domain, alternated with unidirectional transmission elements 64 for blocking domain growth toward the input port. For simplicity in understanding, the unidirectional elements 64 are shown with the same construction at those in FIG. 3. Other constructions, of course, can be used. A nucleate conductor 66 is provided, typically by printed circuit techniques, crossing over the channel 56 at the onput ports 58 and a sensing conductor 68 crosses the channel at the output port 60. Each conductor 66 and is electrically insulated from the channel 56.

A helical printed circuit conductor 70, with the helix axis parallel to the designated easy axis of magnetization and essentially coextensive with the channel 56, has turns that encircle the slab 54 to produce the PROPAGATE and ERASE fields for the shift register. A hold conductor 72 is applied by printed circuit or like techniques as a thin conductive ribbon passing back and forth in a zigzag-like manner over, and insulated from the channel 56 in a manner similar to that discussed above with reference to FIG. 1.

The illustrated shift register of FIG. 4 also has an optional blocking conductor 74 formed as a single continuous printed circuit conductor having narrow sections 74*a* in an alternate series successive with wide return conductor sections 74*b*. The narrow sections 74*a* cross the channel 56 centered over the hold conductor sections that cross the channel, and the wide sections 74*b* cross the channel intermediate the narrow sections. The blocking conductor sections 74*a* are sufficiently narrower than the channel-crossing sections of the hold conductor so that during a propagate step a domain can advance to a hold conductor and be "sheltered" by it during the succeeding erase and hold step, even when the blocking conductor passing over the hold conductor at that point is energized to prevent the domain from propagating further along the channel 56. This operation is usually readily attained when the hold conductor 72 portion is not covered by the blocking conductor 74, on the side of the hold conductor from which domains arrive along the channel 56, has a width 76 at least of about one-third the width of the sections 74*a*.

The illustrated blocking conductor 74 zigzags across the channel 56 twice as many times as the hold conductor 72 for the purpose of having each blocking conductor section 74*a* carry current in the same direction over the channel 56 as the other conductor sections 74*a* in series with it. Further, each blocking conductor return section 74*b* is considerably wider than the sections 74*a* for the purpose of disturbing the magnetic field which these return sections 74*b* produce. More particularly, current is applied to the blocking conductor 74, in accordance with the foregoing discussion relative to FIG. 1, with a polarity to produce a blocking field that cancels the PROPAGATE field at each point where the blocking conductor sections 74*a* cross the channel 56. However, the blocking conductor return sections 74*b* pass over the channel 56 in the direction opposite to the passage of the sections 74*a* and hence produce a field in the same direction as the PROPAGATE field. The additive resultant of the PROPAGATE field and the blocking field of the return sections 74*b* must be insufficient to nucleate a domain of reverse magnetization. It is for this reason that the blocking conductor return sections 74*b* are relatively wide, since the increase in width reduces the intensity of the magnetic field which current in these conductor sections produces.

By way of illustration, the shift register of FIG. 4 can be built with the channel 64 being 0.002 inch wide in the straight sections thereof over which the hold conductor 72 passes, and being 0.0008 inch wide in the narrow, angled sections thereof. Further, the narrow angled sections illustratively extend at an angle of 30° from the wider straight sections. Also the channel length between successive "pointed ends" of the unidirectional elements is around 0.020 inch. With these dimensions, the shift register operates with a propagate field between about 5 and 10 oersteds. Hence, a drive field specified as 7.5 oersteds can have a 33% tolerance, i.e. a tolerance of plus or minus 2.5 oersteds. The erase field can be 10 oersteds or more and the hold field is then the same as or greater than the erase field, provided it is insufficient to nucleate domains. The currents required to generate these fields depend, of course, on the geometries of the drive and hold conductors.

Further, by way of illustration, a shift register constructed as shown in FIG. 4 operates reliably without use of the blocking conductor with PROPAGATE field pulses of between 0.7 and 1.5 microseconds in duration. Use of the blocking conductor was found desirable with longer PROPAGATE field pulses. Also, the present shift register employs a "folded" path only for compactness and ease of construction. On the other hand, the register can have essentially any number of folds; for instance, an illustrative 50-stage register has nine folds interconnecting ten legs, each of five stages. It is also to be understood that designation herein that the first transmission element in each stage is a bidirectional element is only for clarity of description, for each stage can alternatively be considered as starting with a unidirectional element.

It will thus be seen that the objects set forth above, among those made apparent from the preceding description, are efficiently attained. Since certain changes may be made in the above constructions without departing from the scope of the invention, it is intended that all matter contained within the above description or shown in the accompanying drawings shall be interpreted as illustrative within the spirit of the invention.

Also, it should be understood that the term "unidirectional" is used herein with reference to a magnetic domain transmission element that propagates a reverse magnetization domain in only one direction along the axis of an applied PROPAGATE or equivalent magnetic field, even though the element extends in both directions along that axis.

Having described the invention, what is claimed as new and secured by Letters Patent is:

1. Magnetic logic apparatus for operation as a shift register of binary information, said apparatus comprising, (a) a succession of bidirectional magnetic domain tip propagation transmission elements arranged along a signal path between an input transmission element and an output transmission element (b) a plurality of unidirectional magnetic domain tip propagation transmission elements, each of which propagates a magnetic domain in only a forward direction relative thereto and each of which is connected between two successive bidirectional transmission elements to form a signal path of alternate bidirectional elements and unidirectional elements between said input and output elements, with the direction of forward propagation in said unidirectional elements being from said input element toward said output element (c) first magnetic field producing means for producing a first magnetic field for propagating a magnetic domain from one bidirectional element to the next successive bidirectional element along said path, and for alternatively producing a second magnetic field for erasing magnetic domains from said signal path, and (d) second magnetic field producing means for producing a third magnetic field, at alternate ones only of said bidirectional elements, in opposition to said second magnetic field.

2. Apparatus as defined in claim 1 further comprising, (a) information-writing means for introducing a magnetic domain into said signal path at said input transmission element and (b) information-reading means for sensing the arrival of a magnetic domain at said output transmission element.

3. Apparatus as defined in claim 1 in which said second field producing means is arranged to produce said third magnetic field only at a first set of alternate ones of said bidirectional transmission elements, and alternatively, only at a second set of the alternate ones of said bidirectional elements excluded from said first set of bidirectional elements.

4. Apparatus as defined in claim 1 further comprising control means for operating said first and second field producing means to produce said first field to propagate a magnetic domain from a first of said bidirectional elements to the next, second successive bidirectional element along said path, and then to produce said second field and said third field substantially simultaneously to cancel each other at said second transmission element only and to erase magnetic domains from said path at said one bidirectional transmission element and at said unidirectional transmission element interconnecting said first and second bidirectional elements.

5. Apparatus as defined in claim 4

(a) comprising further field producing means for producing, at said bidirectional element, a further magnetic field in opposition to, and substantially of equal magnitude to, said first field, and (b) in which said control means operates said further field producing means to produce said further field concurrent with the production of said first magnetic field.

6. Apparatus as defined in claim 1 in which said bidirectional transmission elements and said unidirectional transmission elements are arranged to conduct magnetic domains substantially along a single lineal axis.

7. A magnetic shift register comprising, (a) a magnetic medium having a first magnetic coercivity, (b) an elongated magnetic region within said medium and bounded along the sides thereof by said medium and having a second magnetic coercivity materially lower than said first coercivity and having an easy axis of magnetization extending along the direction of elongation, (c) said region having alternate sections of bidirectional magnetic transmission and unidirectional magnetic transmission forming a magnetic domain tip propagating signal path between first and second points therealong with said unidirectional transmission sections arranged with the direction of magnetic transmission therein oriented from said first point toward said second point and with each section extending between said points longitudinal to said easy axis of magnetization, (d) means for applying a first magnetic field to said region and oriented along said easy axis of magnetization to advance a domain of reverse magnetization within said region from one section of bidirectional transmission to the next successive bidirectional transmission section along said path, (e) means for applying a second magnetic field to said region in opposition to said first magnetic field to erase said reverse magnetization domains from said path, and (f) means for applying a third magnetic field to only alternate bidirectional transmission sections along said path in opposition and equal to said second field, so that application of said third field simultaneous with said second field prevents the erasure of any said domains present at said alternate bidirectional transmission sections.

8. A magnetic shift register as defined in claim 7 further comprising, (a) input means for applying a magnetic field to said region at said first point therealong to nucleate a domain of reverse magnetization within said region, (b) output means for sensing the arrival of a domain of reverse magnetization at said second point along said region, and (c) sequencing means normally operable in a cyclic sequence successively to operate said means to apply said first magnetic field, operate said means for applying said second and third magnetic fields simultaneously, again operate said means for applying said first magnetic field, and then again operate said means for applying said second and third fields simultaneously; thereby successively to advance a domain of reverse magnetization from a first bidirectional transmission section to the next successive second bidirectional section along said path, to erase a domain of reverse magnetization from said first bidirectional section and from the unidirectional section interconnecting said first and second bidirectional sections, to advance a domain of reverse magnetization from said second bidirectional section to the next successive third bidirectional transmission section along said path, and then to erase a domain of reverse magnetization from said second bidirectional section and from the unidirectional transmission section connected between said second and third bidirectional sections.

9. A magnetic shift register as defined in claim 8 in which said means for applying said third magnetic field includes a current conductor arranged to cross back and forth over said region of bidirectional sections with crossings in one direction being over first alternate bidirectional sections along said path and with crossings in the other direction being over the other alternate ones of said bidirectional sections, and (b) current source means connected with said current conductor and normally operable in one said cyclic sequence to apply current to said conductor in a first direction to produce said third field for the first time in each cycle and thereafter to apply current in the opposite direction to said current conductor.

10. A magnetic shift register as defined in claim 8 further comprising, (a) blocking current conductor means arranged to cross said region intermediate successive unidirectional conduction sections, and (b) means for applying current to said blocking conductor means concurrent with the operation of said means for applying said first magnetic field and with a direction so as to produce a magnetic field at said region-crossings in opposition to said first magnetic field.

References Cited

UNITED STATES PATENTS

| | | | |
|---|---|---|---|
| 3,230,515 | 1/1966 | Smaller | 340—174 |
| 3,248,713 | 4/1966 | Middelhoek | 340—174 |
| 3,438,006 | 4/1969 | Spain | 340—174 |
| 3,438,016 | 4/1969 | Spain | 340—174 |
| 3,461,442 | 8/1969 | Spain et al. | 340—174 |
| 3,465,316 | 9/1969 | Spain et al. | 340—174 |

STANLEY M. URYNOWICZ, Jr., Primary Examiner

PO-1050
(5/69)

UNITED STATES PATENT OFFICE
CERTIFICATE OF CORRECTION

Patent No. 3,562,722 Dated February 9, 1971

Inventor(s) Harvey I. Jauvtis

It is certified that error appears in the above-identified patent and that said Letters Patent are hereby corrected as shown below:

Column 4, line 5 reading stage 10a opposite to the end connection to the bidirecshould read stage 10a opposite to the end connected to the bidirec- Column 5, line 23 reading field alternately "holds" domains only lat the first bidishould read field alternately "holds" domains only at the first bidi- Column 7, line 17 & 18 reading propagate during a given propagate during a given propa-
gate step.

should read propagate during a given propagate step.

Column 7, line 44 reading ing over the channel 56 at the onput ports 58 and a sensi should read ing over the channel 56 at the input ports 58 and a sensi

PO-1050
(5/69)

UNITED STATES PATENT OFFICE
CERTIFICATE OF CORRECTION

Patent No. 3,562,722 Dated February 9, 1971

Inventor(s) Harvey I. Jauvtis

It is certified that error appears in the above-identified patent and that said Letters Patent are hereby corrected as shown below:

Column 7, line 46 reading

Each conductor 66 and is electrically insulated from the should read

Each conductor 66 and 68 is electrically insulated from t

Column 8, line 11 reading purpose of disturbing the magnetic field which these reshould read purpose of distributing the magnetic field which these re Signed and sealed this 3rd day of August 1971.

(SEAL)
Attest:

EDWARD M.FLETCHER,JR.
Attesting Officer

WILLIAM E. SCHUYLER, JR.
Commissioner of Patents